(12) United States Patent
Philpott et al.

(10) Patent No.: US 8,495,675 B1
(45) Date of Patent: Jul. 23, 2013

(54) METHOD AND SYSTEM FOR DYNAMICALLY INSERTING CONTENT INTO STREAMING MEDIA

(75) Inventors: Gregory Robert Philpott, Toronto (CA); Indravadan Vipinbhai Patel, Toronto (CA); Christopher Gary Dinn, Toronto (CA)

(73) Assignee: mDialog Corporation, Toronto, Ontario (CA)

( * ) Notice: Subject to any disclaimer, the term of this patent is extended or adjusted under 35 U.S.C. 154(b) by 0 days.

(21) Appl. No.: 13/561,188

(22) Filed: Jul. 30, 2012

(51) Int. Cl.
*H04H 60/33* (2008.01)
*H04N 7/10* (2006.01)
*H04N 7/025* (2006.01)
*H04N 7/16* (2011.01)
*H04N 7/173* (2011.01)

(52) U.S. Cl.
USPC ........ 725/34; 725/9; 725/32; 725/35; 725/36; 725/62; 725/86; 725/87; 725/105; 725/109; 725/110; 725/112

(58) Field of Classification Search
USPC ........................................................ 725/32
See application file for complete search history.

(56) References Cited

U.S. PATENT DOCUMENTS

| | | | |
|---|---|---|---|
| 6,792,047 B1 | 9/2004 | Bixby et al. | |
| 8,145,782 B2 | 3/2012 | McGowan et al. | |
| 2004/0158858 A1 | 8/2004 | Paxton et al. | |
| 2004/0237102 A1 | 11/2004 | Konig et al. | |
| 2007/0089126 A1* | 4/2007 | Fritz et al. ......................... | 725/32 |
| 2007/0220566 A1 | 9/2007 | Ahmad-Taylor | |
| 2008/0092168 A1 | 4/2008 | Logan et al. | |
| 2008/0274752 A1 | 11/2008 | Houri | |
| 2009/0049090 A1 | 2/2009 | Shenfield et al. | |
| 2009/0077580 A1 | 3/2009 | Konig et al. | |
| 2010/0037204 A1 | 2/2010 | Lin et al. | |
| 2010/0124907 A1 | 5/2010 | Hull et al. | |
| 2010/0228880 A1 | 9/2010 | Hunt et al. | |
| 2011/0265116 A1* | 10/2011 | Stern et al. ........................ | 725/35 |
| 2011/0302307 A1 | 12/2011 | Zhong et al. | |
| 2012/0005313 A1 | 1/2012 | McGowan et al. | |
| 2012/0030313 A1 | 2/2012 | McGowan et al. | |
| 2012/0047542 A1* | 2/2012 | Lewis et al. ....................... | 725/97 |
| 2012/0059721 A1 | 3/2012 | Blegen | |
| 2012/0066285 A1 | 3/2012 | McGowan et al. | |
| 2012/0066386 A1 | 3/2012 | McGowan et al. | |
| 2012/0072465 A1 | 3/2012 | McGowan et al. | |
| 2012/0072541 A1 | 3/2012 | Carls et al. | |
| 2012/0072542 A1 | 3/2012 | McGowan | |
| 2012/0185895 A1* | 7/2012 | Wong et al. ....................... | 725/32 |
| 2012/0197419 A1 | 8/2012 | Dhruv et al. | |
| 2012/0198089 A1 | 8/2012 | Dhruv et al. | |
| 2012/0198492 A1* | 8/2012 | Dhruv et al. ..................... | 725/32 |
| 2012/0254367 A1 | 10/2012 | McGowan | |

* cited by examiner

*Primary Examiner* — Justin Shepard
(74) *Attorney, Agent, or Firm* — Perry+Currier Inc.

(57) ABSTRACT

The present invention teaches a method and system for dynamically inserting content into a streaming media program. The system and method provide a program manifest to rendering devices requesting a streaming media program and that manifest can include URIs which point to main program content on a content delivery network and includes meta URIs (mURIs) which point to a dynamic content decisioning server. The dynamic content decisioning server receives requests for the content indicated by the mURIs and operates to dynamically select content, from a dynamic content delivery network, to fulfill the requests. The selection can be based upon a variety of criteria, including viewer and/or rendering device demographics, advertiser campaign strategies, etc. Thus two or more rendering devices playing streaming media defined by the same manifest may render different inserted content for their viewers. Similarly, a program rendered from a manifest at one point in time may have different inserted content than the same program rendered by the same rendering device at another time.

22 Claims, 2 Drawing Sheets

METHOD AND SYSTEM FOR DYNAMICALLY INSERTING CONTENT INTO STREAMING MEDIA

FIELD OF THE INVENTION

The present invention relates to a system and method for dynamically inserting content into streaming media. More particularly, the present invention relates to a system and method of inserting content into streaming media, where that content can be selected dynamically at, or near, the time of playback.

BACKGROUND OF THE INVENTION

The spread of the Internet and the general availability of data connections is changing the way media is provided and used. In particular, conventional television and/or radio (i.e.—audio) services are increasingly giving way to digital network-based streaming media on demand and/or live streaming media. Such streaming media content can be delivered through any digital network, such as a cable company's set top box-based network or a cellular data network, or increasingly, through the Internet. The delivery can be to any suitable rendering device, such as an Apple TV or an Xbox 360, connected to a television or monitor, or can be to a rendering device and display, such as an Internet TV or a mobile device, such as player software executing on an Apple iPad, a laptop computer, a mobile phone, etc.

In most cases, streaming media is delivered in "chunks" through the network to the player. Each chunk will typically contain the video and/or audio information required to render a selected duration, such as ten seconds, of the media at a given resolution or playback quality. When a player plays a program, it downloads a manifest that defines the chunks making up the program and the player downloads the first one or more chunks of the program specified by the manifest into a player cache and begins playback with those chunks while the next needed chunks, as defined by the manifest, are being downloaded through the network. In this manner, playback of the program can start before the entire program has been downloaded.

Live programs are broadcast in a similar manner but with a manifest that is dynamically updated, having content added to the manifest as the live event transpires. Such live programs are broadcast with a slight delay (e.g.—fifteen seconds) and the manifest is updated during the streaming of the program to include URI's or other indicators of the newly added content.

As the market shifts towards delivery of content via such streaming media delivery systems, the ability to advertise in such streaming media has also offered new opportunities to advertisers and content deliverers. For example, it is desirable, when media is requested by a viewer, to select the advertisements to be shown and/or played during the delivery of the program (i.e.—targeted advertisements), the advertisements being selected based upon any suitable criteria, such as: viewer demographics, including where the player/viewer is located and/or the particular viewer watching the content; the type of rendering device (mobile versus fixed) that the content is being played on; etc. In fact, a wide range of demographic and other criteria could be applied to the selection of which advertisements (or other content) will be shown to which viewers and the full range of such considerations is beyond the scope of the present invention.

However, the need to define a manifest, or equivalent, before beginning playback of a streaming program has limited the ability to dynamically insert content into streaming media to only the simplest cases. Any such content, whether advertising or other content, to be played during the program must presently be specified at the time of creation of the manifest and this severely limits the benefits and advantages that would otherwise be available in a streaming media system. Thus, the media delivery system can, based upon the viewer's reported location (for example, from their IP address), select from a set of manifests which have been previously created for the requested program. The system can select an existing manifest suitable for viewers in the particular location, but the system can not respond dynamically to many other demographic, time or other properties of interest to an advertiser or other content provider.

The need to have predefined manifests, or manifests created at download time, which specify all content to be rendered limits the desired ability to dynamically select content to display to the user after the manifest has been downloaded. Similar problems exist with dynamic manifests for live programs, as each rendering device receives the same manifest, thus limiting the ability to dynamically insert content to different rendering devices.

For example, it may be desired to have an interactive advertisement campaign which is responsive to the viewer's activities. Such a campaign can comprise displaying an advertisement for a special deal on delivery pizza and, in such a case, it may be desired to define the campaign such that, if the viewer responds to the advertisement and orders a pizza, no subsequent advertisements are shown for that pizza deal in the streamed media program and subsequent available advertisement playback times in the streamed media program can be used for other advertisers. However, if the viewer does not respond to the first advertisement for the pizza, the same advertisement or related advertisements for the delivery pizza can be played to the viewer in subsequent available advertisement playback times. While the benefits of such a campaign are many, to date it has not been possible to implement such a campaign.

Further, presently if it is desired to change the advertisements to be played during a streaming media program, it is necessary to create a new manifest. Thus, if a manifest is created today for a program, playback of the same program next week will likely require a new manifest to be created at that time to include advertisements which are then relevant, instead of those advertisements which were relevant today.

Even if it were possible to create and recreate manifests, as needed, when a program is first downloaded to define the advertisement content of a program, such a system may not be able to cope with the extreme demands which can be placed on it. For example, in a live streaming media program (such as a major sporting event) millions of viewers may simultaneously (or near simultaneously) request the program, and thus millions of manifests would need to be created at the same time if they were to provide for targeted advertisements.

Accordingly, it is desired to have a system and method which provides for the dynamic insertion of content, such as targeted advertisements, into streaming media.

SUMMARY OF THE INVENTION

It is an object of the present invention to provide a novel system and method for dynamically inserting content into streaming media which obviates or mitigates at least one disadvantage of the prior art.

According to a first aspect of the present invention, there is provided a method of dynamically inserting content into a streaming media program, comprising the steps of: (i) receiving, through a data communications network, at a program management system a request from a rendering device for delivery of a streaming media program; (ii) providing from the program management system a manifest to the requesting rendering device through the data communications network, the manifest containing at least one identifier to enable downloading, through the data communications network, of identified data which can be rendered by the rendering device to produce a portion of the streaming media program and at least one meta identifier which the rendering device can use to establish communication with a dynamic content decisioning server, the meta identifier representing a time period in which dynamic content is to be rendered by the rendering device, the manifest further indicating a time order in which to render the identified data and dynamic content; (iii) the rendering device rendering the streaming media program, in the indicated order, by downloading the identified data and rendering it and, when the indicated order indicates a meta identifier should next be rendered, the rendering device communicating with the dynamic content decisioning server to request the dynamic content to be rendered; (iv) upon receiving the communication from the rendering device, the dynamic content decisioning server selecting at least one piece of dynamic content for transfer to the rendering device for inserting in the rendering of the streaming media program and transferring that selected dynamic content to the rendering device; and (v) the rendering device rendering the dynamic content.

Preferably, the dynamic content decisioning server selects the at least one piece of dynamic content responsive to one or more of: demographic data related to the rendering device; the current time; the location of the rendering device; the network address of the rendering device; GPS data provided from the rendering device; the data communications network through which the rendering device is communicating to the dynamic content decisioning server; and an event initiated by a user of the rendering device.

According to another aspect of the present invention, there is provided a system for dynamically inserting content into a streaming media program, the system comprising: a program management system storing metadata about streaming media programs available from the system, the program management system operable to receive requests for a streaming media program from a rendering device and to provide a manifest to the rendering device, the manifest containing at least one piece of identified data available from a content delivery network which can be rendered by the rendering device to produce a portion of the streaming media program and at least one meta identifier which the rendering device can use to establish communication with a dynamic content decisioning server, the meta identifier representing a time period in which dynamic content is to be rendered by the rendering device and the manifest further indicating a time order in which to render the identified data and dynamic content; and a dynamic content decisioning server operable to receive communications from the rendering device according to the at least one meta identifier and to select data representing dynamic content to be rendered at the rendering device in the represented time period.

According to yet another aspect of the present invention, there is provided a method of dynamically inserting content into a streaming media program, comprising the steps of: (i) receiving, through a data communications network, at a program management system a request from a rendering device for delivery of a streaming media program; (ii) providing from the program management system a manifest to the requesting rendering device through the data communications network, the manifest containing at least one one meta identifier which the rendering device can use to establish communication with a dynamic content decisioning server, the meta identifier representing a time period and order in which dynamic content is to be rendered by the rendering device; (iii) the rendering device rendering the streaming media program by communicating with the dynamic content decisioning server to request the dynamic content to be rendered; (iv) upon receiving the communication from the rendering device, the dynamic content decisioning server selecting at least one piece of dynamic content for transfer to the rendering device for rendering by the rendering device and transferring that selected dynamic content to the rendering device; and (v) the rendering device rendering the dynamic content.

According to yet another aspect of the present invention, there is provided a system for dynamically inserting content into a streaming media program, the system comprising: a program management system storing metadata about streaming media programs available from the system, the program management system operable to receive requests for a streaming media program from a rendering device and to provide a manifest to the rendering device, the manifest containing at least one meta identifier which the rendering device can use to establish communication with a dynamic content decisioning server, the meta identifier representing a time period in which dynamic content is to be rendered by the rendering device and the manifest further indicating a time order and duration in which to render the dynamic content; and a dynamic content decisioning server operable to receive communications from the rendering device according to the at least one meta identifier and to select data representing dynamic content to be rendered at the rendering device in the represented time period.

Thus, the present invention can provide for the dynamic insertion of media content at, or near, the time of playback, into streaming media.

The present invention teaches a method and system for dynamically inserting content into streaming media. The system and method provide a manifest, or equivalent, to rendering devices requesting a streaming media program and that manifest can include URIs, or other suitable indicators, which point to main (requested) program content on a content delivery network and includes meta URIs (mURIs) which point to a dynamic content decisioning server. The dynamic content decisioning server receives requests for the content indicated by the mURIs and operates to dynamically select and process content, from a dynamic content delivery network, to fulfill the requests. The selection of dynamic content can be based upon a variety of criteria, including viewer and/or rendering device demographics, advertiser campaign strategies, etc. Thus two or more rendering devices playing streaming media from the same manifest may render different dynamically inserted content for their respective viewers. Similarly, a streaming media program rendered from a manifest at one point in time may have different inserted content than the same streaming media program rendered by the same rendering device at another time.

Other features and advantages of the present invention are described more fully below.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
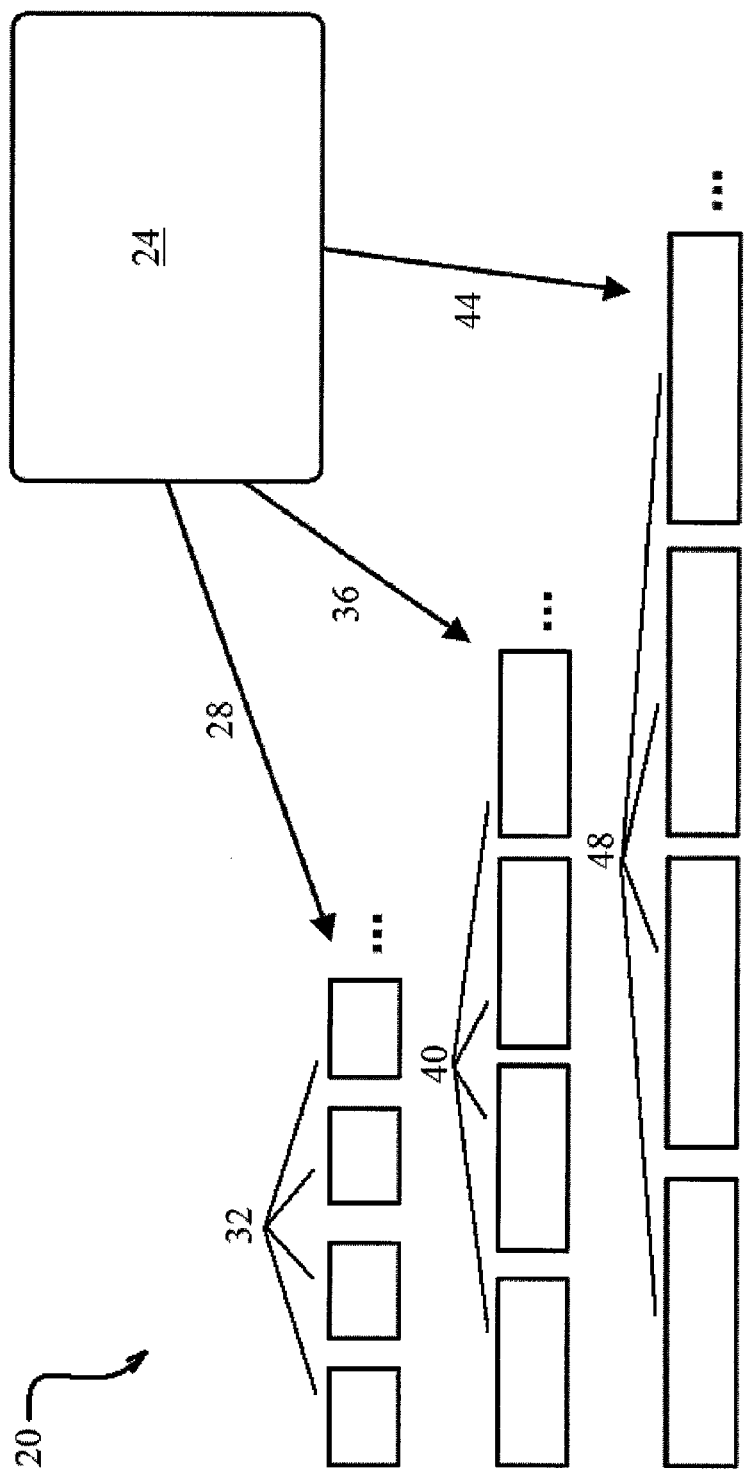
FIG. 1 shows a schematic representation of a streaming media program.

As used herein, the term "streaming media" and "streaming media program" are intended to broadly encompass any media program including at least digital video and/or digital audio content which can be rendered and played by a rendering device at the receiving end of one or more wired or wireless data connections. Streaming media or streaming media programs can be audio programs and/or music, video on demand programs, linear video programs, live video programs or interactive programs and can be transported through the data network in any suitable manner as will occur to those of skill in the art.

Further, while the following discussion refers, as an example, to the HLS protocol proposed by Apple in an IETF draft RFC, and to MPEG-2 transport streams being transmitted with that protocol via a TCP/IP network, the present invention is not so limited. Instead the present invention can be employed with a wide variety of streaming protocols and network protocols for delivering streaming media programs.

The latest draft RFC for the HLS protocol is entitled "HTTP Live Streaming: draft-pantos-http-live-streaming-08" and is dated Mar. 23, 2012 and the contents of this document are incorporated herein, in their entirety, by reference. The MPEG-DASH protocol, developed by the MPEG consortium, is another example of a streaming media protocol with which the present invention can be employed and other suitable protocols exist or may be developed in the future.

As used herein, the term "chunk" is intended to comprise any segment, fragment or other portion into which streaming media is arranged for transmission through an appropriate network by a content provider. As will be understood by those of skill in the art, chunks may also subsequently be rearranged by the transport (or other) layer(s) of the respective network (i.e.—TCP/IP packet segmentation and reassembly) but as used herein a chunk is the portion of the streaming media data as provided to a network by the content provider and which can render a predefined duration of the digital media. In some embodiments, a URI, or equivalent, may define a desired portion of a streaming program which is stored in one or more files on a storage system, such as a content delivery network. The definition of the desired portion can be via a sequence number, desired time range, etc. In such a case, the content delivery network on which the file is stored will assemble a chunk comprising an appropriate portion of the file, or files, corresponding to the requested portion of the program and that chunk will be streamed to the requesting device. In any case, as used herein, the term "chunk" is intended to comprise any suitable structure for streaming media content to a rendering device.

As used herein, the term "manifest" is intended to broadly include manifests, as defined by the HLS protocol, media presentation descriptions (MPDs) as defined by the MPEG-DASH protocol or any other data structure or method for sufficiently describing the contents of a streaming media program, at one or more resolutions, for playback through a network. Also as used herein, the term URI is meant to broadly include any suitable method of identifying data available for access through a network, such as the URIs defined in the IETF RFC3986 "Uniform Resource Identifier (URI): Generic Syntax", or any other suitable mechanism, system or method for identifying such data.

Further still, as used herein the term "inserted content" and/or "dynamically inserted content" is intended to comprise any media content, video and/or audio, which it is desired to insert into a streaming media program. While the most common example of inserted content may be advertising programming, it is also contemplated that other content can be inserted, if desired, and such inserted content can include: alternate endings to streaming media programs; substitution of program durations with other programs or black screens such as for sports "blackouts"; changes to scenes or portions of scenes within a streaming media program; TV-like "channel surfing" through available streaming media programs, live or on demand, where the inserted content is the streaming media program on the channel the user switches to; etc. Further, inserted content can be overlay content displayed or played in combination with the main program. Such overlay content can also be interactive content and the use of such content is described in published U.S. patent application 2011/0145858, assigned to the assignee of the present invention.

FIG. 1 shows a schematic representation of an HLS streaming media program 20 for a video on demand program. Program 20 includes a program manifest 24 which defines the content required to render the program, including any inserted content. In the case of video on demand programming or the like, manifest 24 is pre-constructed before, or when, the program is requested by a user. For a live streaming program, manifest 24 is created dynamically, as the program is being broadcast.

Conventionally, manifest 24 comprises, amongst other things, a set of URIs (Uniform Resource Identifiers) which identify the chunks of media content which make up the program. While manifest 24 can include a master manifest which refers to sub manifests which each identify chunks of the media content at a respective resolution/quality, or other similar structures, as used herein the term manifest is intended to generically define the data provided to the rendering device to render a program and can include components such as a master manifest and a collection of sub-manifests and equivalents, if such are present.

In the present invention, manifest 24 can also comprise one or more meta URIs (mURIs) which will be dynamically resolved, as described below, to indicate content which is dynamically incorporated into the streaming media. The set of URIs and mURIs in manifest 24 identify the chunks of the main media program and the inserted content, respectively, to be played and defines when each chunk should be played. In protocols other than HLS, identifiers equivalent to URIs and mURIs of the chunks of data to be rendered, and the order in which they are to be rendered, will be provided.

In the present invention, manifest 24 preferably includes URIs and mURIs which identify the content of the program and the dynamically inserted content at different quality levels (different resolutions, compression levels, etc.) to allow the streaming of the program to be accomplished despite variations in the ability of the network to timely deliver the streamed program.

In FIG. 1, manifest 24 includes a set 28 of URIs and/or mURIs which identify low resolution content chunks 32 of the program and dynamic content, a set 36 of URIs and/or mURIs which identify medium resolution content chunks 40 of the program and dynamic content and a set 44 of URIs and/or mURIs which identify high resolution content chunks 48 of the program and dynamic content. In response to changes in network transmission rates, or other factors, a player can switch, at a chunk boundary, from rendering the media program at one resolution/quality (for example from medium resolution stream of chunks 40) to rendering the media program at another resolution/quality (for example low resolution stream of chunks 32).

Figure 2:
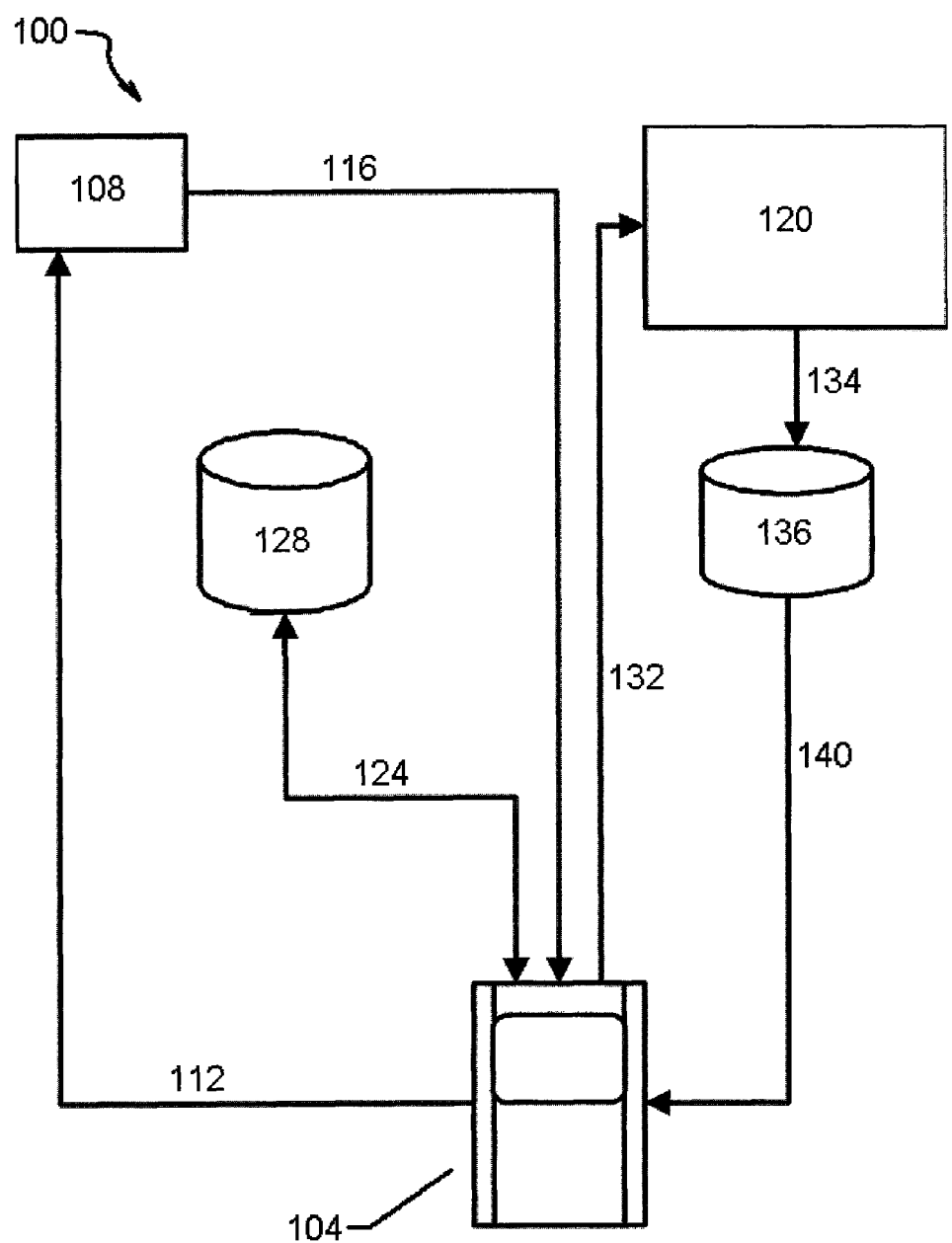
FIG. 2 shows a schematic representation of a streaming media system in accordance with the present invention.

FIG. 2 shows a streaming media system 100 in accordance with the present invention and a rendering device 104 for playback of streaming media. As will be apparent, rendering device 104 can be a dedicated playback device, such as a purpose built digital media player, or can be an appropriate software player executing on hardware such as a computing tablet (eg.—as an Apple iPad) or the like, a gaming device (eg.—a Microsoft Xbox360) or the like, a media player, such as an Apple TV, connected to an appropriate television or other display, etc.

While not explicitly indicated in FIG. 2, the interconnection of components of system 100 and the connections to rendering device 104 are accomplished via one or more data networks. As will be apparent from the description below, these data networks can be proprietary/private, such as cable companies' set-top box networks, and/or public networks, such as the Internet. It is contemplated that, in many circumstances, a combination of proprietary and public networks will be employed in system 100. Further, these data networks can be wired, or wireless, permitting delivery of streaming content to rendering devices 104 at fixed locations and/or to rendering devices 104 which are mobile and/or nomadic.

Returning now to FIG. 2, system 100 includes a program management system 108 which contains metadata and other information about streaming media programs available from system 100. Program management system 108, which can comprise a content information system, content management system or any other suitable system for accepting requests for streaming pmedia programs, either includes, or has access to, pre-created manifests for the available content, or is capable of creating such manifests, or having them created, as needed.

When a user of rendering device 104 wishes to play a streaming media program available from system 100, rendering device 104 sends a request 112 for the desired program to program management system 108. The format of request 112 is not particularly limited and any method of requesting an available program can be employed. It is contemplated that, in some embodiments, request 112 can include additional explicit and/or implicit information, such as demographic information indicating specifics about rendering device 104 (type of device, location of the device, etc.) and/or about the user of rendering device 104 (location of user from an IP address or GPS data provided by the rendering device, network the user is connecting through, user demographic information, etc. from the user's account set up information or the like) when such information is available. In other embodiments, this additional information can be provided, via a cookie, from the user's IP address or via any other suitable method as will be apparent to those of skill in the art. Such additional information can be used by system 100 in a variety of manners, including as an input to a dynamic content decisioning server 120, as described further below.

Upon receiving a valid request 112, program management system 108 provides rendering device 104 with a manifest 116, or a reference to manifest 116, for the requested streaming program. It is contemplated that manifest 116 will have been previously created for the requested program, but it is also contemplated that manifest 116 can be created in response to receiving request 112, can be mapped to an existing live manifest or can be a dynamically created manifest for a live streaming media program.

In the illustrated embodiment of the present invention, manifest 116 includes URI's which indicate the chunks of the requested streaming media program and also includes mURIs which indicate dynamic content to also be rendered, as discussed further below. In a presently preferred embodiment, program management system 108 will also pass relevant information about the playback session (such as any user demographic information) to dynamic content decisioning system 120, as discussed further below.

Manifest 116 will have been created with predefined time points at which dynamically inserted content is to be played, as well as the durations of that dynamically inserted content. It is contemplated that, in some embodiments, program management system 108 can have two or more manifests 116 available for a streaming media program with different amounts and/or arrangements of dynamic content and one of the available manifests 116 will be selected and provided to rendering device 104 as appropriate.

For example, based upon data included in request 112, or other information about rendering device 104 or its user available to system 100, it can be the case that system 100 determines that the user of rendering device 104 is a premium level user and should have minimal inserted content in the requested program. In such a case program management system 108 can provide a manifest 116 which defines only two thirty-second durations of inserted content additions in the fifteen minute streaming media program. If program management system 108 determines that the user of rendering device 104 is a non-premium level user and should have more inserted content in the requested program, program management system 108 will provide a manifest 116 which defines four, or more, thirty-second durations of inserted content additions to the fifteen minute program.

In any case, a manifest 116 is provided to rendering device 104 which can then begin playback of the requested program. Specifically, rendering device 104 will communicate (124) with a content delivery network 128, using the URIs (or equivalents) in manifest 116 to request and download appropriate chunks of the requested program and playback of the streaming media program can proceed in a substantially conventional manner.

When rendering device 104 encounters a meta URI (mURI) in manifest 116, that mURI directs rendering device 104 to request 132 content indicated by the mURI from dynamic content decisioning server 120, rather than from content delivery network 128.

Request 132 includes information identifying the streaming media program being rendered on device 104 and can also include the total timespan of the break in the program available for insertion of content and additional information relating to user demographics, player type, etc. which additional information can also be employed by dynamic content decisioning server 120. Because URIs (and mURIs) represent a pre-selected fixed timespan of content, a timespan in a streaming media program for dynamic content will typically comprise several mURIs. For example, if chunks of the streaming media program render ten second timespans of content, a two-minute break for dynamically inserted content would require twelve mURIs, each representing ten seconds of rendered content.

In this case, at least the first mURI for each dynamic timespan in the streaming media program would preferably include information indicating to decisioning server 120 the total length (timespan) of the break from the main program. Alternately, such information can be supplied to dynamic content decisioning system 120 from program management system 108 or other source when manifest 116 is provided to rendering device 104 or by any other suitable method as may occur to those of skill in the art.

Dynamic content decisioning server 120 comprises a decisioning device, such as an advertisement decisioning service or other suitable system, and is responsive to request 132 to select one or more pieces of streaming media content. Advertisement and other content decisioning is a well-known field and suitable decisioning methods and systems will be apparent to those of skill in the art and the actual decisioning system employed with the present invention is not particularly limited.

In response to request 132, dynamic content decisioning server 120 selects one or more pieces of streaming media content, whose total duration equals the available timespan for the inserted content, to be provided to rendering device 104 for playback as dynamically inserted content. Dynamic content decisioning server 120 informs (134) a dynamic content delivery network 136, or other suitable source, of the identity of the decisioned content to be provided to rendering device 104 for playback during the break from the main program.

In a simple embodiment of the present invention, content dynamic delivery network 136 can simply store and provide the dynamic content selected by dynamic content decisioning server 120 to rendering device 104. In such a case, advertisements are selected subject to them fitting the timespan associated with the mURIs. For example, if a set of three mURI's correspond to a thirty second duration for inserted content, the dynamic content decisioning server 120 will select an advertisement, or other dynamic content, with a thirty second duration (i.e.—in three chunks of ten seconds each) and dynamic content delivery network 136 will provide that content in response to the mURIs.

In a more desirable implementation of system 100, dynamic content decisioning server 120 can select any combination of dynamic content, in accordance with the selection parameters (user demographics, etc) provided to it, which combination's combined duration equals the duration represented by the mURIs.

If the mURIs, for example, represent a two minute duration (twelve mURIs, each having a ten second duration), dynamic content decisioning server 120 can, for example, select a first piece of dynamic content with a thirty second duration, a second and third piece of dynamic content each with fifteen second durations, a fourth piece of dynamic content with a forty-five second duration and a sixth piece of dynamic content with a fifteen second duration.

As is known, streaming media to be rendered should not stop other than on a chunk boundary to avoid the introduction of artifacts and/or dead space in the streaming media program. In the example above, the second piece of dynamic content with the fifteen second duration would be represented by two ten-second chunks and would break this rule as it would result in an empty five seconds in the second half of the second chunk.

In the preferred embodiment, for this example dynamic content delivery network 136 will concatenate the dynamic media sources of the six pieces of dynamic content and will then chunk the results to provide the corresponding chunks (in this example twelve chunks) to rendering device 104 in response to the mURIs.

In a presently preferred embodiment of the invention, dynamic content delivery network 136 concatenates transport stream versions of the dynamic content and rewrites/corrects the associated time streaming information for the resulting concatenated transport stream so that the dynamic media need not be re-rendered and/or re-encoded and yet can be rendered at rendering device 104 without visual or audio artifacts.

In any case, dynamic content delivery network 136 provides (140) the first chunk of the decisioned content, now corresponding to the first mURI, to rendering device 104. As rendering device 104 processes each remaining mURI by requesting 132 content from dynamic content decisioning server 120, those requests are directed to the corresponding chunks of the selected content on dynamic content delivery network 136 which delivers (140) that content to rendering device 104.

While the example of FIG. 2 is for pre-recorded media, such as video on demand, it will be apparent to those of skill in the art that the present invention can easily also be employed with live streaming media programs. As such, live streaming programs can provide a single manifest to with thousands of users and yet each of those users can, if desired, receive targeted (perhaps uniquely to them) advertisements and/or combinations of advertisements as decisioned by dynamic content decisioning server 120.

As should now be apparent, the present invention provides significant advantages over the prior art. For example, with the present invention it is possible to create and store one manifest, employing mURIs, which can be downloaded by thousands of users, each of whom can have different dynamic content presented to them during their playback of the program. Previously, without the present invention, such a result could only be achieved if a different manifest was created for each user.

Also, in the prior art, once a manifest was created, each time it was played the same advertisements (or other inserted content) would be played. Thus, if an advertisement campaign ended, the content provider had to either create new manifests for their programs which no longer referred to the expired advertisement, or had to allow the original advertisement to be shown without generating revenue.

As another advantage, with the present invention conditioned advertising campaigns can be executed. For example, a pizza delivery firm may wish to show its advertisement up to five times during a program, but not after a viewer has responded to the advertisement. If the advertisement features an interactive "click here to order your pizza" link and the user does so to order a pizza, dynamic content decisioning server 120 can decision other advertisements into the subsequent mURI durations previously allocated to the pizza delivery firm during that program. This allows the content provider to potentially increase advertisement revenue by selling those subsequent durations to other advertisers.

Another advantage of the present invention is that it allows advertisements to be sold for playback at a particular time. For example, a fast food delivery advertiser can purchase advertisement space at dinner time (in the relevant region/timezone) and, with no change to the manifest created for a program, dynamic content decisioning server 120 can relate mURIs to that advertiser's content when those mURIs are forwarded to dynamic content decisioning server 120 from a rendering device 104 at dinner time (however defined) in the timezone/region in which that rendering device 104 is located. As will be apparent, in such a case two rendering devices 104, one on the east coast of the US at 9:00 PM EST and one on the west of the US at 6:00 PST, each playing the same manifest 116 will be provided with different dynamic content for their viewers, the west coast viewers seeing the advertisement for the fast food delivery firm while the viewers on the east coast see an advertisement from a different company.

Yet another advantage of the present invention is that it allows for different advertising pricing models to be employed, such as auction-based sale of advertisement slots and/or real-time arbitrage of advertising content inventory.

As should now be apparent, the use of mURIs with the present invention allows for inserted media content to be selected dynamically, in near real time, for playback in a streaming media program. This flexibility provides numerous advantages over prior art systems, some of which are described above.

The present invention teaches a method and system for dynamically inserting content into a streaming media program. The system and method provide a program manifest to rendering devices requesting a streaming media program and that manifest includes URIs which point to main (requested) program content on a content delivery network and meta URIs (mURIs) which point to a dynamic content decisioning server. The dynamic content decisioning server receives requests for the content indicated by the mURIs and operates to dynamically select and process content, from a dynamic content delivery network, to fulfill the requests. The selection can be based upon a variety of criteria, including viewer and/or rendering device demographics, advertiser campaign strategies, etc. Thus two rendering devices playing streaming media from the same manifest may render different dynamically inserted content for their respective viewers. Similarly, a program rendered from a manifest at one point in time may have different inserted content than the same program rendered by the same rendering device at another time.

The above-described embodiments of the invention are intended to be examples of the present invention and alterations and modifications may be effected thereto, by those of skill in the art, without departing from the scope of the invention which is defined solely by the claims appended hereto.

We claim:

1. A method of dynamically inserting content into a streaming media program, comprising the steps of:
(i) receiving, through a data communications network, at a program management system a request from a rendering device for delivery of a streaming media program;
(ii) providing from the program management system a manifest to the requesting rendering device through the data communications network, the manifest containing (iia) at least one identifier to enable downloading, through the data communications network, of identified data which can be rendered by the rendering device to produce a portion of the streaming media program and (iib) at least one meta URI which the rendering device can use to establish communication with a dynamic content decisioning server, the meta URI representing a time period in which dynamic content, not yet selected to be downloaded, is to be rendered by the rendering device, the manifest further indicating a time order in which to render the identified data and dynamic content;
(iii) the rendering device rendering the streaming media program, in the indicated order, by downloading the identified data and rendering it and, when the indicated order indicates a meta URI should next be rendered, the rendering device communicating with the dynamic content decisioning server to request the dynamic content to be rendered;
(iv) upon receiving the communication from the rendering device during the rendering of the streaming media program, the dynamic content decisioning server selecting at least one piece of dynamic content to correspond to the meta URI for transfer to the rendering device for inserting in the rendering of the streaming media program and transferring that selected dynamic content to the rendering device, the dynamic content decisioning server deciding which dynamic content is to be rendered (i) only during the rendering of the streaming media program by the rendering device, and (ii) at the time period of the streaming media program in which dynamic content is to be rendered; and
(v) the rendering device rendering the dynamic content.

2. The method of claim 1 wherein the dynamic content decisioning server selects the at least one piece of dynamic content responsive to demographic data related to the rendering device.

3. The method of claim 2 where the demographic data is included in the request to the program management system and the program management system provides that demographic information to the dynamic content decisioning server.

4. The method of claim 1 wherein the dynamic content decisioning server selects the at least one piece of dynamic content responsive to the current time.

5. The method of claim 1 wherein the dynamic content decisioning server selects the at least one piece of dynamic content responsive to the location of the rendering device.

6. The method of claim 5 wherein the location of the rendering device is determined according to its network address.

7. The method of claim 5 wherein the location of the rendering device is determined from GPS data provided from the rendering device.

8. The method of claim 5 wherein the location of the rendering device is determined from the data communications network through which the rendering device is communicating to the dynamic content decisioning server.

9. The method of claim 1 wherein the dynamic content decisioning server selects the at least one piece of dynamic content responsive to an event initiated by a user of the rendering device.

10. The method according to claim 1 wherein, at step (iv), the dynamic content decisioning server selecting at least two pieces of dynamic content for transfer to the rendering device, the at least two pieces of selected dynamic content have a total duration equal to that specified by the meta identifier and the dynamic content decisioning server combining the at least two pieces of selected dynamic content and transferring that combined selected dynamic content to the rendering device for rendering.

11. The method of claim 1 wherein the requested streaming media program is a live program and the program management system dynamically updates the manifest provided to the rendering device.

12. The method of claim 1 wherein the meta URI does not designate the dynamic content when the manifest is provided to the requesting rendering device.

13. The method of claim 1 wherein the streaming media program is arranged in chunks of data, each chunk rendering a selected time duration of the streaming media program and each chunk being identified by a URI.

14. A system for dynamically inserting content into a streaming media program, the system comprising:
a program management system storing metadata about streaming media programs available from the system, the program management system operable to receive requests for a streaming media program from a rendering device and to provide a manifest to the rendering device, the manifest containing at least (i) one piece of identified data available from a content delivery network which can be rendered by the rendering device to produce a portion of the streaming media program and (ii) at least one meta identifier which the rendering device can use to establish communication with a dynamic content decisioning server, the meta identifier representing a time period in which dynamic content, not yet selected to be downloaded, is to be rendered by the rendering device, and the manifest further indicating a time order in which to render the identified data and dynamic content; and a dynamic content decisioning server operable to receive communications from the rendering device during rendering of the streaming of the media program at the rendering device, the received communication corresponding to the at least one meta identifier, the dynamic content decisioning server then selecting data representing dynamic content to be rendered at the rendering device during the rendering of the streaming of the media program at the rendering device, the dynamic content decisioning server deciding which dynamic content is to be rendered (i) only during the rendering of the streaming media program by the rendering device, and (ii) at the time period of the streaming media program in which dynamic content is to be rendered.

15. The system of claim 14 wherein the dynamic content decisioning server selects the data representing dynamic content responsive to demographic data related to the rendering device.

16. The system of claim 14 wherein the dynamic content decisioning server selects the data representing dynamic content responsive to the time of day.

17. The system of claim 14 wherein the dynamic content decisioning server selects the data representing dynamic content responsive to the location of the rendering device.

18. The system of claim 14 wherein the dynamic content decisioning server selects the data representing dynamic content responsive to an event initiated by a user of the rendering device.

19. A method of dynamically inserting content into a streaming media program, comprising the steps of:
  (i) receiving, through a data communications network, at a program management system a request from a rendering device for delivery of a streaming media program;
  (ii) providing from the program management system a manifest to the requesting rendering device through the data communications network, the manifest containing at least one meta identifier which the rendering device can use to establish communication with a dynamic content decisioning server, the meta identifier representing a time period and order in which dynamic content is to be rendered by the rendering device, the meta identifier corresponding to dynamic content which is not determined at the time the manifest is provided to the requesting rendering device;
  (iii) the rendering device rendering the streaming media program by communicating with the dynamic content decisioning server to request the dynamic content to be rendered;
  (iv) upon receiving the communication from the rendering device, the dynamic content decisioning server selecting at least one piece of dynamic content for transfer to the rendering device for rendering by the rendering device and transferring that selected dynamic content to the rendering device, the dynamic content decisioning server deciding which dynamic content is to be rendered (i) only during the rendering of the streaming media program by the rendering device, and (ii) at the time period of the streaming media program in which dynamic content is to be rendered; and
  (v) the rendering device rendering the dynamic content.

20. The method according to claim 19 wherein, at step (iv), the dynamic content decisioning server selecting at least two pieces of dynamic content for transfer to the rendering device, the at least two pieces of selected dynamic content have a total duration equal to that specified by the meta identifier and the dynamic content decisioning server combining the at least two pieces of selected dynamic content and transferring that combined selected dynamic content to the rendering device for rendering.

21. A system for dynamically inserting content into a streaming media program, the system comprising:
  a program management system storing metadata about streaming media programs available from the system, the program management system operable to receive requests for a streaming media program from a rendering device and to provide a manifest to the rendering device, the manifest containing at least one meta identifier which the rendering device can use to establish communication with a dynamic content decisioning server, the meta identifier representing a time period in which dynamic content is to be rendered by the rendering device and the manifest further indicating a time order and duration in which to render the dynamic content; and
  a dynamic content decisioning server operable to receive communications from the rendering device according to the at least one meta identifier and to select data representing dynamic content to be rendered at the rendering device in the represented time period, the dynamic content decisioning server deciding which dynamic content is to be rendered (i) only during the rendering of the streaming media program by the rendering device, and (ii) at the time period of the streaming media program in which dynamic content is to be rendered.

22. The system of claim 21 wherein the dynamic content decisioning server selects the data representing dynamic content responsive to an event initiated by a user of the rendering device.

* * * * *